United States Patent
Wang

(10) Patent No.: US 7,688,045 B2
(45) Date of Patent: Mar. 30, 2010

(54) DC POWER CONVERSION CIRCUIT WITH CONSTANT CURRENT OUTPUT

(75) Inventor: Shih-Yuan Wang, Tai-Nan (TW)

(73) Assignee: ADDtek Corp., Songshan District, Taipei (TW)

( * ) Notice: Subject to any disclaimer, the term of this patent is extended or adjusted under 35 U.S.C. 154(b) by 264 days.

(21) Appl. No.: 11/776,557

(22) Filed: Jul. 12, 2007

(65) Prior Publication Data

US 2008/0031025 A1 Feb. 7, 2008

Related U.S. Application Data

(60) Provisional application No. 60/821,578, filed on Aug. 7, 2006.

(51) Int. Cl.
*G05F 1/40* (2006.01)
(52) U.S. Cl. ....................................... 323/265
(58) Field of Classification Search ................. 323/222, 323/277, 282–288, 262–267; 361/18, 100, 361/101, 93.03, 152; 363/21.17, 17, 124
See application file for complete search history.

(56) References Cited

U.S. PATENT DOCUMENTS

| 5,408,173 | A | * | 4/1995 | Knapp | ......................... 323/285 |
|---|---|---|---|---|---|
| 5,477,132 | A | * | 12/1995 | Canter et al. | ................. 323/282 |
| 6,020,729 | A | | 2/2000 | Stratakos | |
| 6,232,752 | B1 | | 5/2001 | Bissell | |
| 6,873,138 | B2 | | 3/2005 | Jacobson | |
| 7,180,758 | B2 | | 2/2007 | Lincoln | |
| 7,443,145 | B2 | | 10/2008 | Hackner | |
| 2004/0090217 | A1 | | 5/2004 | Muratov | |
| 2006/0113971 | A1 | | 6/2006 | Watanabe | |
| 2006/0192541 | A1 | | 8/2006 | Hackner | |

FOREIGN PATENT DOCUMENTS

| CN | 1092345 A | 9/1994 |
|---|---|---|
| TW | 200608680 | 3/2006 |

* cited by examiner

*Primary Examiner*—Rajnikant B Patel
(74) *Attorney, Agent, or Firm*—Winston Hsu

(57) ABSTRACT

A DC power conversion circuit with constant current output includes a DC voltage source, a driving circuit and a control signal generator. The DC voltage source is used for providing DC power. The driving circuit includes a switch, a resistor, a diode, and an inductor. The switch has three ends, one used for receiving a control signal. Furthermore, the switch is used for conducting or cutting off a coupling between the other two ends according to the control signal. The resistor is coupled between the switch and a first grounding end. The diode has a first end and a second end coupled to a second grounding end. The inductor has a first end coupled to the first grounding end, and a second end coupled to a load circuit. The control signal generator generates the control signal for the second end of the switch according to a current of the resistor.

16 Claims, 3 Drawing Sheets

DC POWER CONVERSION CIRCUIT WITH CONSTANT CURRENT OUTPUT

CROSS REFERENCE TO RELATED APPLICATIONS

This application claims the benefit of U.S. Provisional Application No. 60/821,578, filed on Aug. 7, 2006 and entitled "DRIVING CIRCUIT AND METHOD OF CONSTANT CURRENT CONTROL FOR LIGHT EMITTING DEVICE", the contents of which are incorporated herein by reference.

BACKGROUND OF THE INVENTION

1. Field of the Invention

The present invention relates to a direct-current (DC) power conversion circuit, and more particularly, to a DC-to-DC power conversion circuit with constant current output.

2. Description of the Prior Art

Light emitting diodes (LEDs) have been widely used in indicating lamps and display devices of information, communications and consumer electronic products, such as traffic light indicators. Unlike incandescent lamps, the LEDs are luminescent devices and have advantages of low power dissipation, long life, extremely short warm-up time and fast reaction. Besides, the LEDs are light, resistant to vibration and easy to mass-produce. Regarding physical characteristics of the LED, luminosity is proportional to LED current, and the LED current increases exponentially with a forward bias. That is, the larger the current that flows through the LED, the higher the luminosity the LED emits. Furthermore, the LED current varies exponentially with ambient temperature.

Specific applications, such as backlights of LCDs and traffic light indicators, require the LED to luminesce stably. Therefore, these applications generally require a voltage conversion circuit to control the LED current, so as to maintain the LED luminosity.

Please refer FIG. 1, which is a schematic diagram of a DC/DC voltage converter 10 according to the prior art. The DC/DC voltage converter 10 includes a direct-current (DC) voltage source 100, a switch transistor 102, a resistor 104, a diode 106, an inductor 108, a capacitor 110, a load circuit 112, a control signal generator 114, and a voltage regulator 116. The control signal generator 114 generates a control signal Sc according to a current of the resistor 104, and thereby the voltage regulator 116 regulates a voltage level of the control signal Sc, so as to control the switch transistor 102. The working principle of the DC/DC voltage converter 10 is explained as follows. As the switch transistor 102 is turned on, the diode 106 bears a reverse bias, and thereby a loop L1 becomes open. As a result, the DC voltage source 100 charges the inductor 108, and meanwhile, an increasing current flows into the resistor 104. As the current of the resistor 104 increases to a specific level, the control signal generator 114 turns off the switch transistor 102 with the control signal Sc. Once the switch transistor 102 is turned off, the inductor 108 accordingly generates an inverse-polarity voltage, so that the diode 106 bears a forward bias and loop L1 begins conducting current. Meanwhile, the current of the resistor 104 starts to decrease gradually. To sum up, the DC/DC voltage converter 10 maintains current output to the load circuit 112 in a tight range by alternatively turning the switch transistor 102 on and off.

In the DC/DC voltage converter 10, the control signal generator 114 and the other devices use a same grounding node, GND, such that the switch transistor 102 and the control signal generator 114 are situated at different voltage levels. The switch transistor 102 operates at a voltage high side, whereas the control signal generator 114 operates at a low side, and the control signal Sc generated is at the voltage low side as well. As a result, the DC/DC voltage converter 10 depends on the voltage regulator 116 to pre-regulate the control signal Sc to an appropriate voltage level for the switch transistor 102. That is, the voltage regulator 116 raises the voltage level of the control signal Sc to the voltage high side. However, the voltage regulator 116 is typically a transformer device, resulting in high circuit complexity and area in the DC/DC voltage converter 10.

SUMMARY OF THE INVENTION

It is therefore a primary object of the present invention to provide a DC power conversion circuit with constant current output that can reduce circuit complexity and production cost.

The present invention discloses a DC power conversion circuit with constant current output. The DC power conversion circuit includes a DC voltage source, a driving circuit and a control signal generator. The DC voltage source is used for providing DC power. The driving circuit includes a switch, a resistor, a diode, and an inductor. The switch has a first end coupled to the DC voltage source, a second end for receiving a control signal, and a third end. Furthermore, the switch is used for conducting or cutting off a coupling between the first end and the third end according to the control signal received by the second end. The resistor has a first end coupled to the third end of the switch and a second end coupled to a first grounding end. The diode has a first end coupled to the third end of the switch and the first end of the resistor, and a second end coupled to a second grounding end. The inductor has a first end coupled to the first grounding end, and a second end coupled to a load circuit. The control signal generator is coupled to the second and third ends of the switch and the first grounding end and is used for generating the control signal for the second end of the switch according to a current of the resistor.

The present invention further discloses a DC power conversion circuit with constant current output. The DC power conversion circuit includes a DC voltage source, a driving circuit and a control signal generator. The DC voltage source is used for providing DC power. The driving circuit includes a switch, a first resistor, a second resistor, a diode, and an inductor. The switch has a first end coupled to the DC voltage source, a second end for receiving a control signal, and a third end. Furthermore, the switch is used for conducting or cutting off a coupling between the first end and the third end according to the control signal received by the second end. The first resistor has a first end coupled to the third end of the switch and a second end coupled to a first grounding end. The second resistor has a first end and a second end coupled to the first grounding end. The diode has a first end coupled to the first end of the second resistor, and a second end coupled to a second grounding end. The inductor has a first end coupled to the first grounding end, and a second end coupled to a load circuit. The control signal generator is coupled to the second and third ends of the switch, the first end of the second resistor, and the first grounding end, and is used for generating the control signal for the second end of the switch according to a current of the first or second resistor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
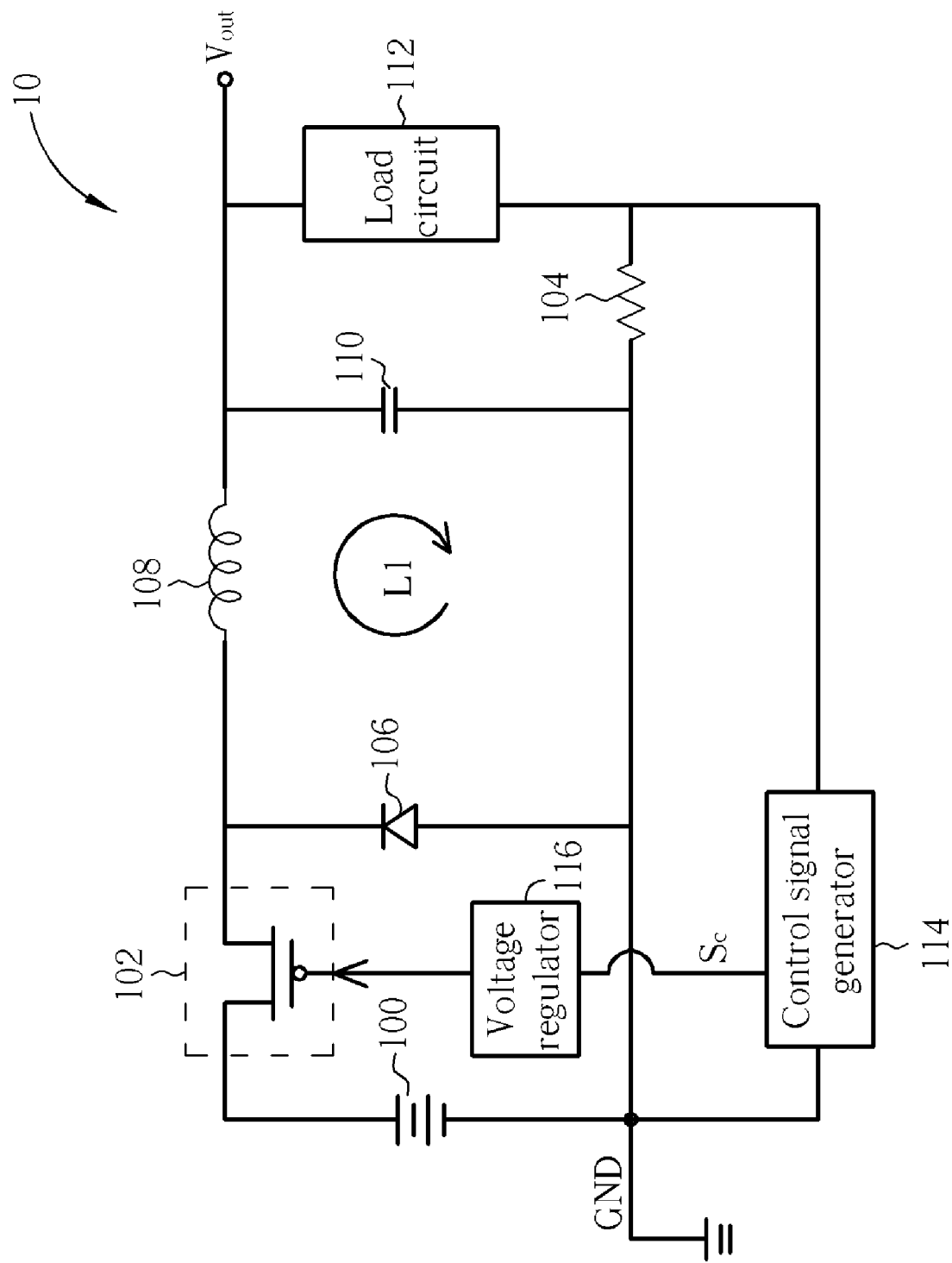
FIG. 1 is a schematic diagram of a DC/DC voltage converter according to the prior art
Figure 2:
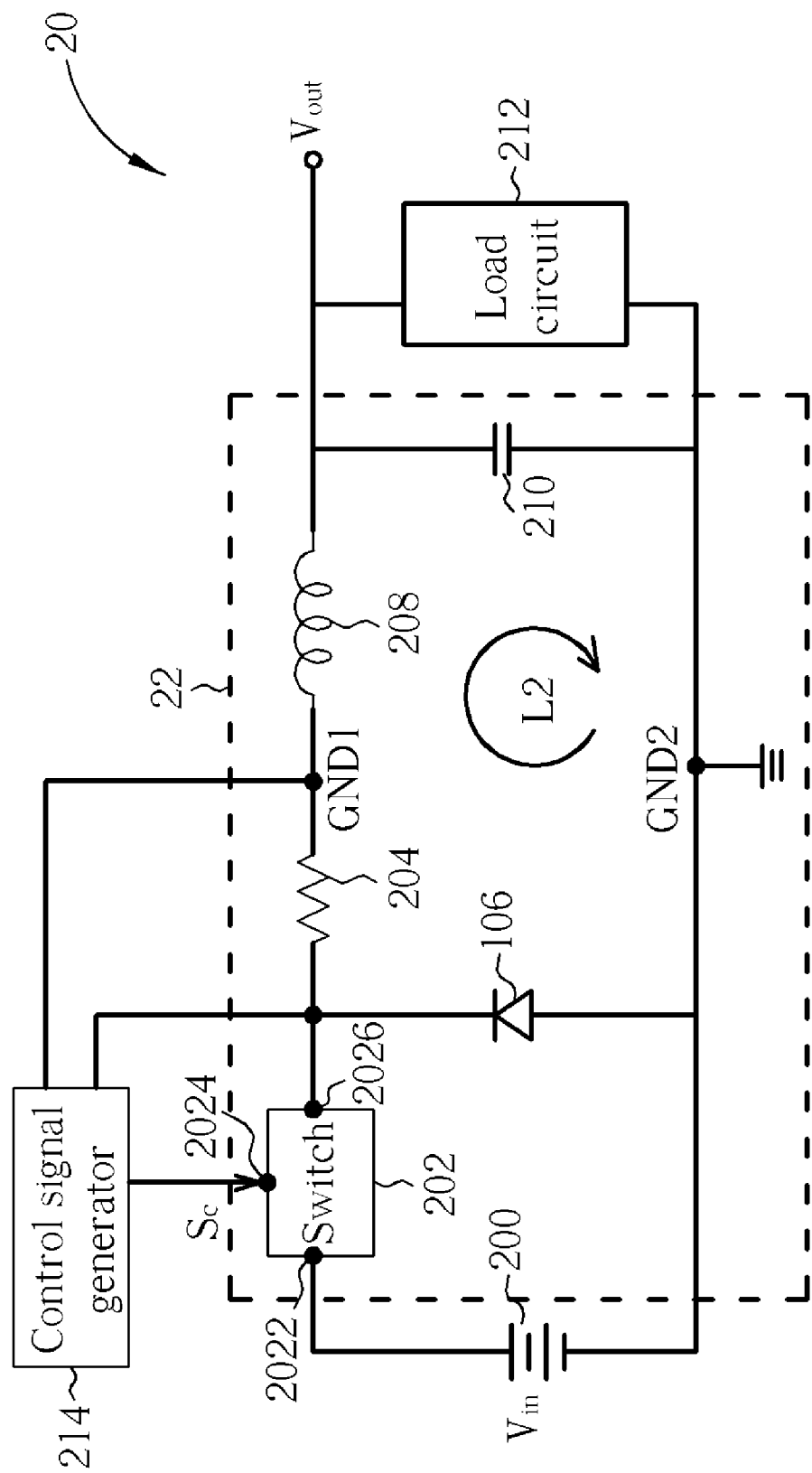
FIG. 2 is a schematic diagram of a DC power conversion circuit according to an embodiment of the present invention.

Please refer to FIG. 2, which is a schematic diagram of a DC power conversion circuit 20 with constant current output according to an embodiment of the present invention. The DC power conversion circuit 20 includes a DC voltage source 200, a driving circuit 22, a control signal generator 214 and a load circuit 214. The DC voltage source 200 is used for providing DC power. The driving circuit 22 has similar architecture to the DC/DC voltage converter 10, and includes a switch 202, a resistor 204, a diode 206, an inductor 208 and a filtering capacitor 210. The switch 202 has a first end 2022 coupled to the DC voltage source 200, a second end 2024 used for receiving a control signal Sc, and a third end 2026. Furthermore, the switch 202 is used for conducting or cutting off coupling between the first end 2022 and the third end 2026 according to the control signal Sc received by the second end 2024. Preferably, the switch 202 is a metal-oxide-semiconductor field-effect transistor (MOSFET), where the first end 2022 is a drain, the second end 2024 is a gate, and the third end 2026 is a source. Alternatively, the switch 202 can also be a bipolar junction transistor (BJT), where the first end 2022 is a collector, the second end 2024 is a base, and the third end 2026 is an emitter. Unlike the resistor 104 coupled between the capacitor 110 and the load circuit 112 in FIG. 1, the resistor 204 is coupled between the switch 202 and the inductor 208, and a first grounding end GND1 is set on the coupling between the resistor 204 and the inductor 208. The diode 206 is coupled between the third end 2026 of the switch 202 and a second grounding end GND2. The diode 206 is preferably a p-n junction semiconductor device where the upper end of the diode 206 is N-doped, and the lower end is P-doped according to FIG. 2. The second grounding end GND2 is used for the DC voltage source 200, whereas the first grounding end GND1 is used for the control signal generator 214. That is, the control signal generator 214 is not commonly grounded with other devices in FIG. 2. The inductor 208 is coupled between the first grounding end GND1 and the load circuit 212, and is used for storing or releasing electrical energy provided by the DC voltage source 200. The filtering capacitor 210 is coupled between the inductor 208 and the second grounding node GND2, and is used for filtering out a noise component of the current outputted to the load circuit 212. The control signal generator 214 is preferably a pulse width modulator, and is coupled to both ends of the resistor 204, one being the first grounding node GND1. The control signal generator 214 senses the current of the resistor 204 and thereby generates the control signal Sc for the second end 2024 of the switch 202 according to the current variation.

The load circuit 212 is a device requiring stable operating current. Taking the LED for example, the stable LED current can maintain the LED luminosity, since the LED luminosity is proportional to the LED current. For provision of stable operating current, the control signal generator 214 senses the current of the resistor 204 to generate the control signal Sc, so as to control the switch 202. The current outputted to the load circuit 212 can be maintained in a specific range with alternate turn-on and turn-off of the switch 202. The detailed operation is described as follows. As the switch 202 turns on (conducts), the diode 206 bears a reverse bias, and thereby a loop L2 becomes open. The DC voltage source 200 starts to charge the inductor 208, and meanwhile the current of the resistor 204 gradually increases with the current of the inductor 208. When the current of the resistor 204 increases to a predetermined maximum level, the control signal generator 214 turns off the switch 202 with the control signal Sc. As soon as the switch 202 turns off, the DC voltage source 200 cannot provide electrical energy, and thus the inductor 208 generates inverse-polarity voltage. The diode 206 changes to operate under a forward bias, and the loop L2 conducts. The current of the resistor 204 accordingly decreases with the current of the inductor 208. When the current of the resistor 204 decreases to a predetermined minimum level, the control signal generator 214 turns on the switch 202 with the control signal Sc. By the above-mentioned operation, the current of the load circuit 212 can be maintained within a specific current range. In the DC power conversion circuit 20, the control signal generator 214 does not share the same grounding node, i.e. the second grounding node GND2, with other devices, but uses the first grounding node GND1. In addition, the resistor 204 couples between the switch 202 and the inductor 208, so that the control signal generator 214 can generate the control signal Sc with a voltage level at the high side. Thus, the control signal Sc can be sent directly to the switch 202, without any assistance from transformer devices.

Figure 3:
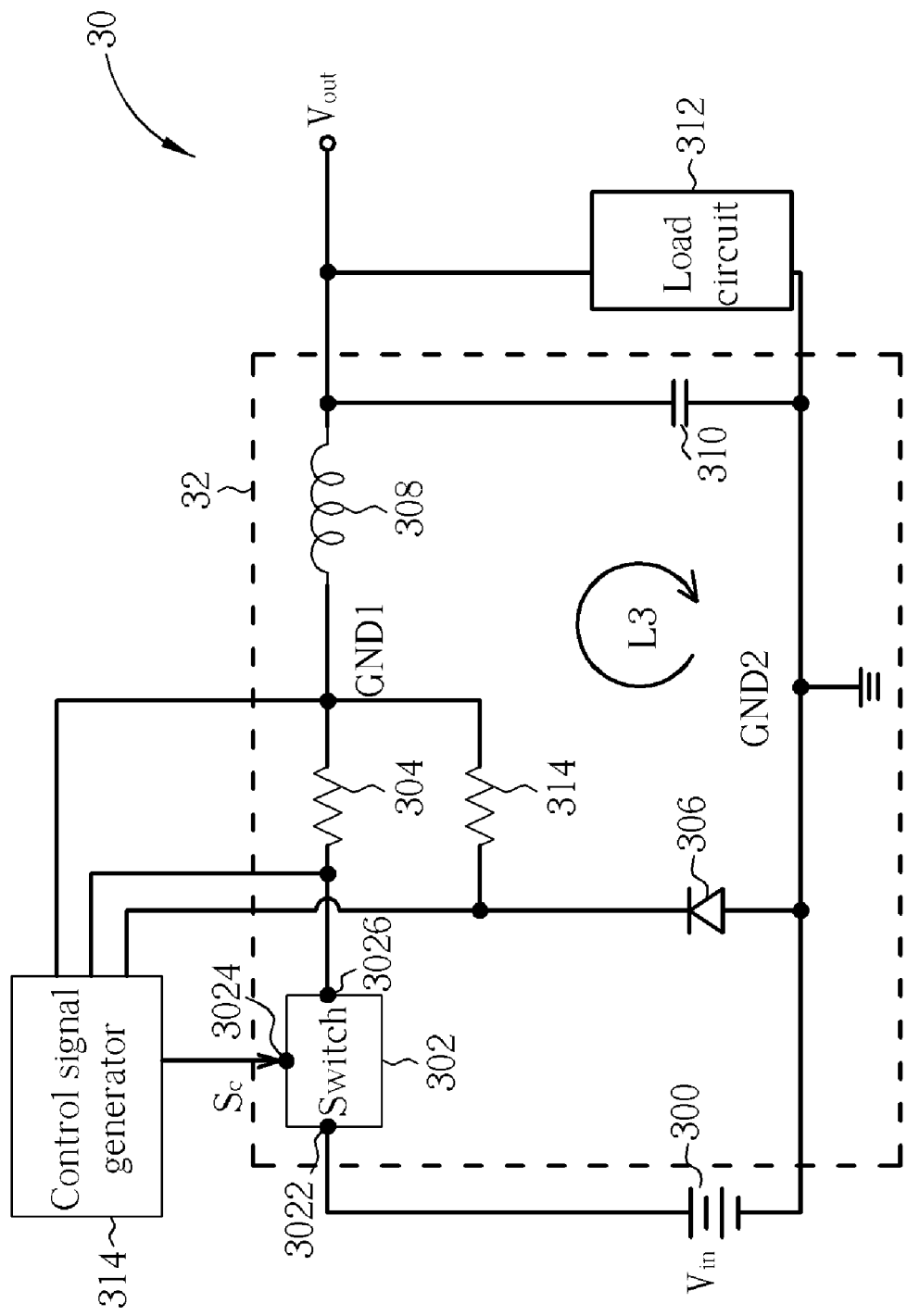
FIG. 3 is a schematic diagram of a DC power conversion circuit according to a second embodiment of the present invention.

Please refer to FIG. 3, which is a schematic diagram of a DC power conversion circuit 30 according to a second embodiment of the present invention. The DC power conversion circuit 30 includes a DC voltage source 300, a driving circuit 32, a control signal generator 314 and a load circuit 312. The DC voltage source 300 is used for providing DC power. The driving circuit 32 is almost the same as the driving circuit 22 in FIG. 2, and includes a switch 302, a first resistor 304, a second resistor 314, a diode 306, an inductor 308, and a filtering capacitor 310. The first resistor 304 and the second resistor 314 both have one end coupled to the first grounding end GND1 and another end coupled to the control signal generator 314. From comparison with the driving circuit 22, it can be seen that the driving circuit 32 adds the second resistor 314 coupled between the grounding node GND1 and the diode 308. As a result, as the switch 302 turns on, the control signal generator 314 generates the control signal Sc according to the current variation of the first resistor 304. As the switch 302 turns off, the control signal generator 314 generates the control signal Sc according to current variation of the second resistor 314.

As the switch 302 turns on, the diode 306 bears a reverse bias. A loop L3 becomes open, and thereby no current flows across the second resistor 314. Besides, the DC voltage source 300 starts to charge the inductor 208, and meanwhile, the current of the first resistor 304 gradually increases with the current of the inductor 308. When the current of the first resistor 304 increases to a predetermined maximum level, the control signal generator 314 turns off the switch 302 with the control signal Sc. As soon as the switch 302 turns off, the DC voltage source 300 cannot provide electrical energy, and thereby no current flows into the first resistor 304. The inductor 308 generates an inverse-polarity voltage, and the diode 306 changes to operate under a forward bias and the loop L3 conducts. A current therefore flows into the second resistor 314, and decreases with the current of the inductor 208. When the current of the second resistor 314 decreases to a predetermined minimum level, the control signal generator 314 turns on the switch 302 with the control signal Sc. By the above-mentioned operation, the current of the load circuit 312 can be maintained within a specific current range. In the DC power conversion circuit 30, the control signal generator 314 does not use the same grounding node, GND2, with other devices, but the first grounding node GND1. In addition, the control signal generator 314 generates the control signal Sc according to the currents of the first resistor 304 and the second resistor 314 during turn-on and turn-off of the switch 302. The control signal Sc is generated at the high-side voltage level. Thus, the control signal Sc can be sent directly to the switch 302 without any assistance from the transformer devices.

In conclusion, according to the prior art, the resistor coupled to the low end of the load circuit has a common ground with the control signal generator. The control signal is generated at a different voltage level from the switch. Therefore, the DC power conversion circuit of the prior art requires the voltage regulator to adjust the voltage level of the control signal. According to the present invention, the control signal generator dose not use the same grounding node as other devices in the DC power conversion circuit, and the resistors are arranged at the next stage of the switch. As a result, the control signal generator and the switch are at the same high-side voltage level. The control signal can be sent directly to the switch, without use of the voltage regulator. Therefore, the DC power conversion circuit of the present invention arranges resistors at the high-side voltage level and couples the control signal generator to the grounding end different from that used by other devices. Therefore, the present invention can reduce circuit complexity and production cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A direct-current (DC) power conversion circuit with constant current output comprising:
    a DC voltage source for providing DC power;
    a driving circuit comprising:
        a switch having a first end coupled to the DC voltage source, a second end for receiving a control signal, and a third end, the switch used for conducting or cutting off a coupling between the first end and the third end according to the control signal received by the second end;
        a resistor having a first end coupled to the third end of the switch and a second end coupled to a first grounding end;
        a diode having a first end coupled to the third end of the switch and the first end of the resistor, and a second end coupled to a second grounding end; and
        an inductor having a first end coupled to the first grounding end, and a second end coupled to a load circuit; and
    a control signal generator having a first input end coupled to the second end of the switch, a second input end coupled to the first grounding end, and an output end coupled to the third end of the switch, the control signal generator for generating the control signal for the second end of the switch according to a current of the resistor.

2. The DC power conversion circuit of claim 1, wherein the control signal generator is a pulse width modulator.

3. The DC power conversion circuit of claim 1 further comprising a filtering capacitor coupled to the second grounding end and the second end of the inductor.

4. The DC power conversion circuit of claim 1, wherein the switch is a metal-oxide-semiconductor field-effect transistor (MOSFET transistor).

5. The DC power conversion circuit of claim 4, wherein the first end of the switch is a drain, the second end of the switch is a gate, and the third end of the switch is a source.

6. The DC power conversion circuit of claim 1, wherein the switch is a bipolar junction transistor (BJT).

7. The DC power conversion circuit of claim 6, wherein the first end of the switch is a collector, the second end of the switch is a base, and the third end of the switch is an emitter.

8. The DC power conversion circuit of claim 1, wherein the first end of the diode is N-doped, and the second end of the diode is P-doped.

9. A direct-current (DC) power conversion circuit with constant current output comprising:
    a DC voltage source for providing DC power;
    a driving circuit comprising:
        a switch having a first end coupled to the DC voltage source, a second end for receiving a control signal, and a third end, the switch used for conducting or cutting off a coupling between the first end and the third end according to the control signal received by the second end;
        a first resistor having a first end coupled to the third end of the switch and a second end coupled to a first grounding end;
        a second resistor having a first end and a second end coupled to the first grounding end;
        a diode having a first end coupled to the first end of the second resistor, and a second end coupled to a second grounding end; and
        an inductor having a first end coupled to the first grounding end, and a second end coupled to a load circuit; and
    a control signal generator coupled to the second and third ends of the switch, the first end of the second resistor, and the first grounding end, for generating the control signal for the second end of the switch according to a current of the first or second resistor.

10. The DC power conversion circuit of claim 9, wherein the control signal generator is a pulse width modulator.

11. The DC power conversion circuit of claim 9 further comprising a filtering capacitor coupled to the second grounding end and the second end of the inductor.

12. The DC power conversion circuit of claim 9, wherein the switch is a metal-oxide-semiconductor field-effect transistor (MOSFET transistor).

13. The DC power conversion circuit of claim 12, wherein the first end of the switch is a drain, the second end of the switch is a gate, and the third end of the switch is a source.

14. The DC power conversion circuit of claim 9, wherein the switch is a bipolar junction transistor (BJT).

15. The DC power conversion circuit of claim 14, wherein the first end of the switch is a collector, the second end of the switch is a base, and the third end of the switch is an emitter.

16. The DC power conversion circuit of claim 9, wherein the first end of the diode is N-doped, and the second end of the diode is P-doped.

* * * * *